United States Patent [19]

Nishide et al.

[11] Patent Number: 5,538,284
[45] Date of Patent: Jul. 23, 1996

[54] DEVICE FOR CONTROLLING ACCELERATION SENSOR

[75] Inventors: Seiji Nishide; Fuminori Teraoka; Hideki Tanaka, all of Aichi-ken, Japan

[73] Assignee: Kabushiki Kaisha Tokai-Rika-Denki-Seisakusho, Aichi-ken, Japan

[21] Appl. No.: 365,746

[22] Filed: Dec. 29, 1994

[30] Foreign Application Priority Data

Jan. 11, 1994 [JP] Japan .................................. 6-001291
Jan. 25, 1994 [JP] Japan .................................. 6-291808

[51] Int. Cl.⁶ .................................................. B60R 22/36
[52] U.S. Cl. .......................... 280/806; 280/735; 297/480; 200/61.45 R
[58] Field of Search ................................ 280/735, 734, 280/806, 801.1; 180/282; 297/468, 474, 480, 479; 72/70.08; 200/61.45 R, 61.52, 61.53

[56] References Cited

U.S. PATENT DOCUMENTS

| | | | |
|---|---|---|---|
| 4,641,041 | 2/1987 | Mattes et al. | 307/10 R |
| 4,889,068 | 12/1989 | Tabata et al. | 280/806 |
| 4,955,638 | 9/1990 | Kinoshita et al. | 280/806 |
| 5,149,128 | 9/1992 | Föhl | 280/734 |
| 5,163,709 | 11/1992 | Mori | 280/806 |
| 5,458,369 | 10/1995 | Matsuki et al. | 280/806 |

FOREIGN PATENT DOCUMENTS

| | | | |
|---|---|---|---|
| 0167792 | 6/1985 | European Pat. Off. | |
| 0565501 | 5/1993 | European Pat. Off. | |
| 2658747 | 6/1978 | Germany. | |
| 4104623 | 10/1991 | Germany | 280/806 |
| 4318350 | 12/1993 | Germany. | |
| 2244202 | 11/1991 | United Kingdom | 280/806 |

Primary Examiner—Christopher P. Ellis
Attorney, Agent, or Firm—Sixbey Friedman Leedom & Ferguson

[57] ABSTRACT

When a vehicle accelerates to a predetermined value, a pretensioner mounted to an occupant seat applies a pulling force to a seat belt under a force produced by detonating an explosive material. When the seat is moved in the longitudinal direction of a vehicle in order to adjust the position and the seat comes to a halt at a frontal end position, an acceleration more than or equal to the predetermined value is developed in an acceleration sensor. However, the acceleration sensor is provided with a lock means mounted to the seat. Even if the seat suddenly stops at the frontal end position, the acceleration sensor is restrained from moving and the pretensioner is not actuated. The lock means is actuated even when a walk-in mechanism for directly moving the seat to the frontal end is operated.

18 Claims, 15 Drawing Sheets

5,538,284

DEVICE FOR CONTROLLING ACCELERATION SENSOR

BACKGROUND OF THE INVENTION

1. Field of the Invention

The present invention relates to a device suitable for use in an acceleration sensor, for controlling the acceleration sensor mounted to an occupant seat movable in the longitudinal direction of a vehicle and provided to actuate a seat belt pretensioner and the like.

2. Description of the Related Art

As a seat belt system mounted to a vehicle, one is known which, for example, is provided with a pretensioner wherein a webbing securing an occupant is retracted a predetermined amount when the vehicle suddenly decelerates, thus removing the looseness of the webbing applied to the occupant by force.

With this type of pretensioner, there is one in which a take-up shaft of a webbing retractor is forcibly rotated so as to tighten a webbing. Another type is one in which a buckle is forcibly pulled so as to tighten a webbing. For example, the latter pretensioner is provided with a gas generator. A cylinder moved under gas pressure is attached to the gas generator and coupled to a buckle via a wire or the like.

A sensor detects a sudden deceleration of the vehicle and the gas generator is operated so as to instantaneously generate gas. The cylinder is moved by the gas. The resultant moving force is transmitted to the buckle via the wire so as to forcibly move the buckle, thereby tightening the webbing.

It is preferable that the seat belt pretensioner and the acceleration sensor be mounted to an occupant seat rather than a vehicle body such as the floor since their positions, relative to the seat, remain unchanged even when the occupant seat is positionally adjusted in the longitudinal direction of the vehicle. However, if the acceleration sensor is mounted to the seat, it is necessary to prevent the pretensioner from operating when a rapid acceleration in the moving end of the seat occurs.

SUMMARY OF THE INVENTION

With the foregoing in view, it is an object of the present invention to provide a device for controlling an acceleration sensor, which can prevent objects to be operated such as a pretensioner, etc. from operating when a seat stops at its frontal moving end position.

According to the present invention, an inertial moving system of the acceleration sensor mounted to a vehicle seat detects a sudden deceleration of a vehicle and transmits a mechanical output to an object to be actuated such as a seat belt pretensioner or the like. Therefore, a seat belt is pulled by the seat belt pretensioner so that a webbing employed in a seat belt system is tightly applied to an occupant.

When the vehicle is in a normal running state, the seat is positionally adjusted in the longitudinal, front or rear, direction of the vehicle. However, when the seat, moved toward the front of the vehicle, strikes against a stopper or the like at a frontal end position and stops moving, a rapid acceleration is developed. In this case, a lock means restrains an inertial moving system of the acceleration sensor from moving in the present invention. Therefore, the pretensioner or the like is not actuated depending on an acceleration developed in the end of the seat moved toward the front of the vehicle. This restraint may be applied to the following cases. Namely, the inertial moving system may be restrained from moving when the occupant seat has reached a frontal end position of the vehicle. Alternatively, the inertial moving system may be restrained from moving when the occupant seat exceeds a range for adjusting a front and rear position thereof and is moved toward the front by a predetermined amount.

When a walk-in mechanism for tilting the occupant seat to the front of the vehicle and allowing an occupant to easily get in and out of the rear seat of the vehicle is provided, the acceleration sensor may be restrained from operating according to the operation of a lever for actuating the walk-in mechanism and the tilting of a seatback to a predetermined angle or more.

Since the present invention is constructed as described above, the present invention can bring about an advantageous effect that objects such as a pretensioner, etc. to be operated can be prevented from operating by accelerations developed due to seat shift and stop operations.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS (Structure of first embodiment)

Figure 1:
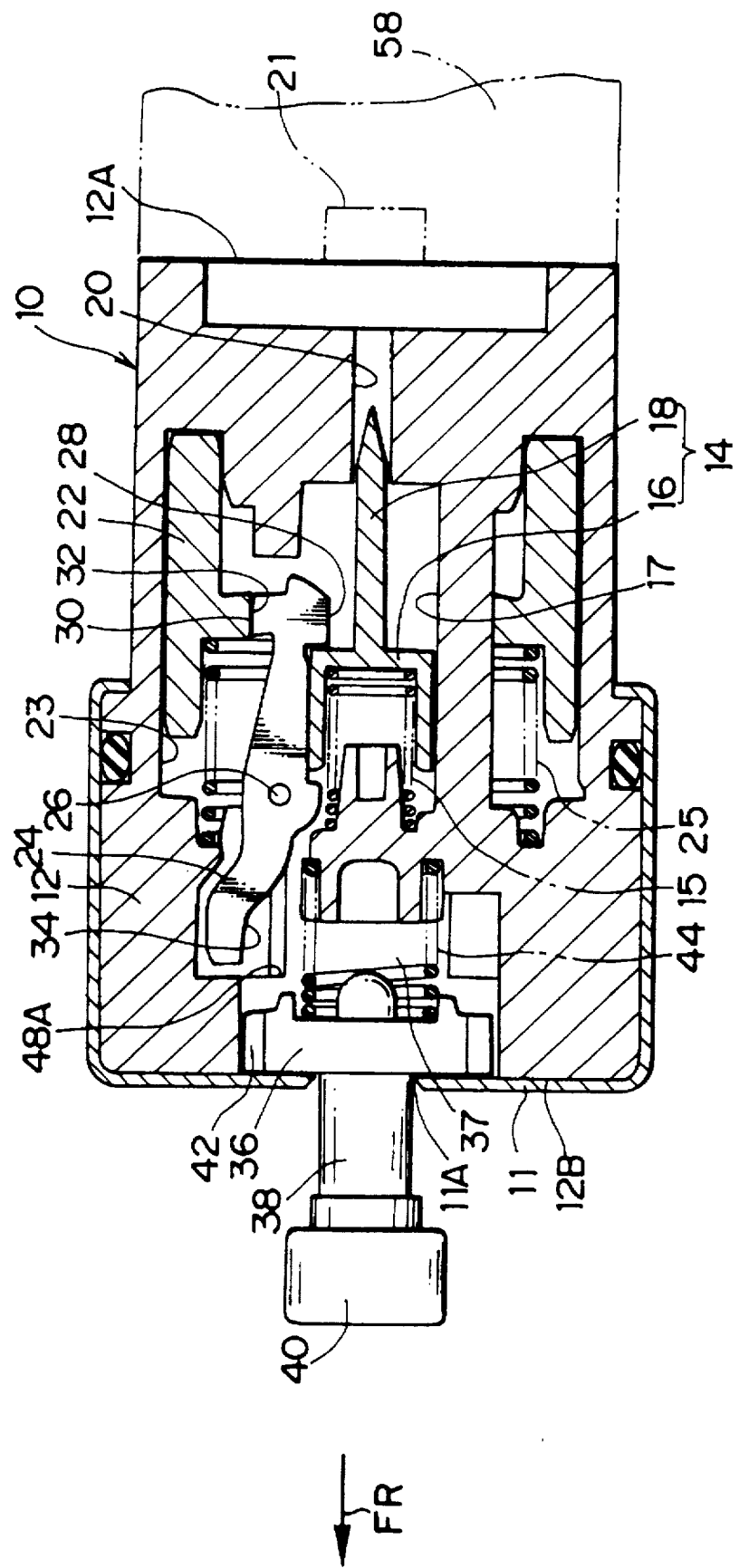
FIG. 1 is a cross-sectional view showing the manner in which a safety device of a mechanical ignition system sensor according to a first embodiment of the present invention is released from being in a locked state.
Figure 2:
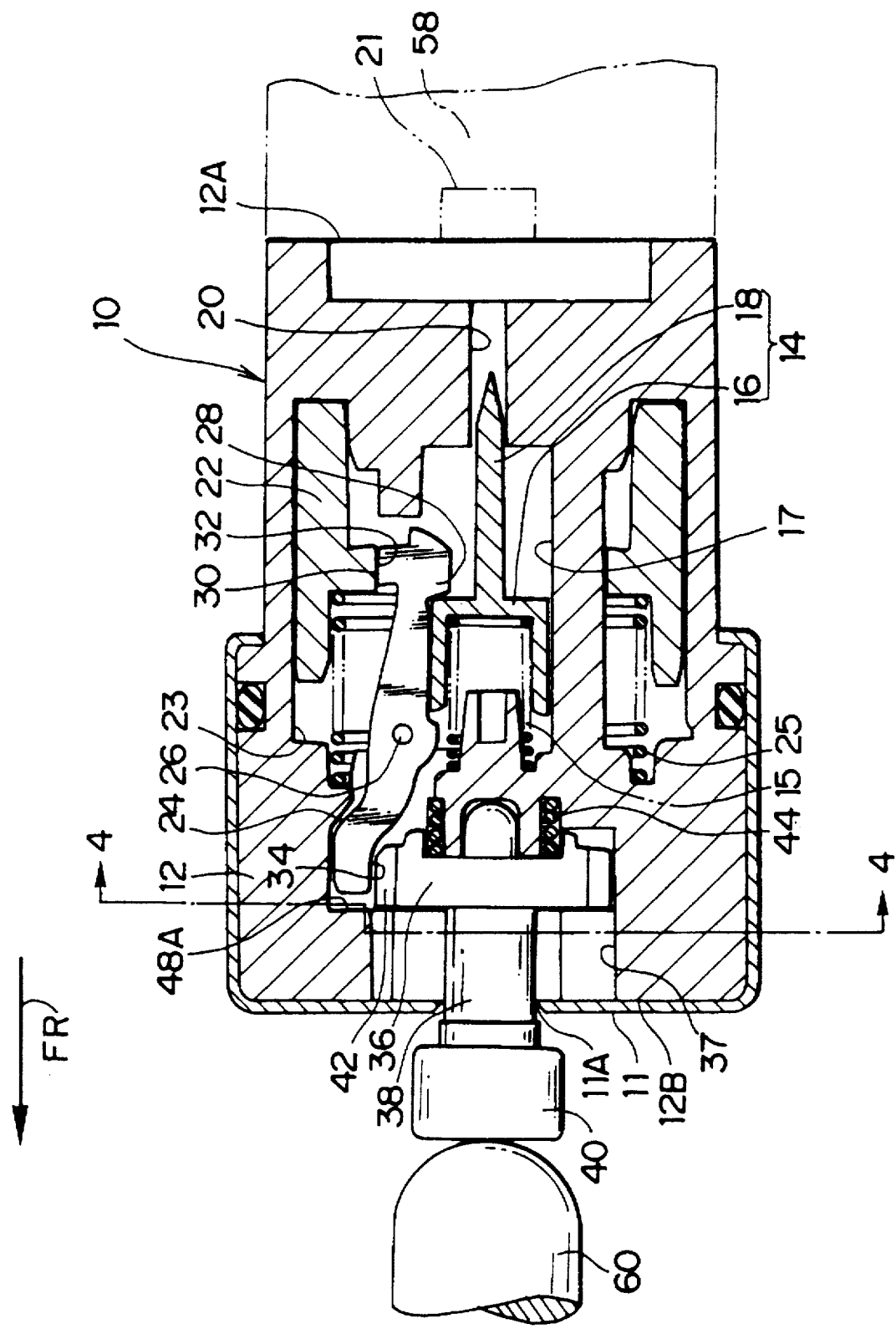
FIG. 2 is a cross-sectional view illustrating the state in which the safety device of a mechanical ignition system sensor according to the first embodiment is activated by a lock pin.
Figure 3:
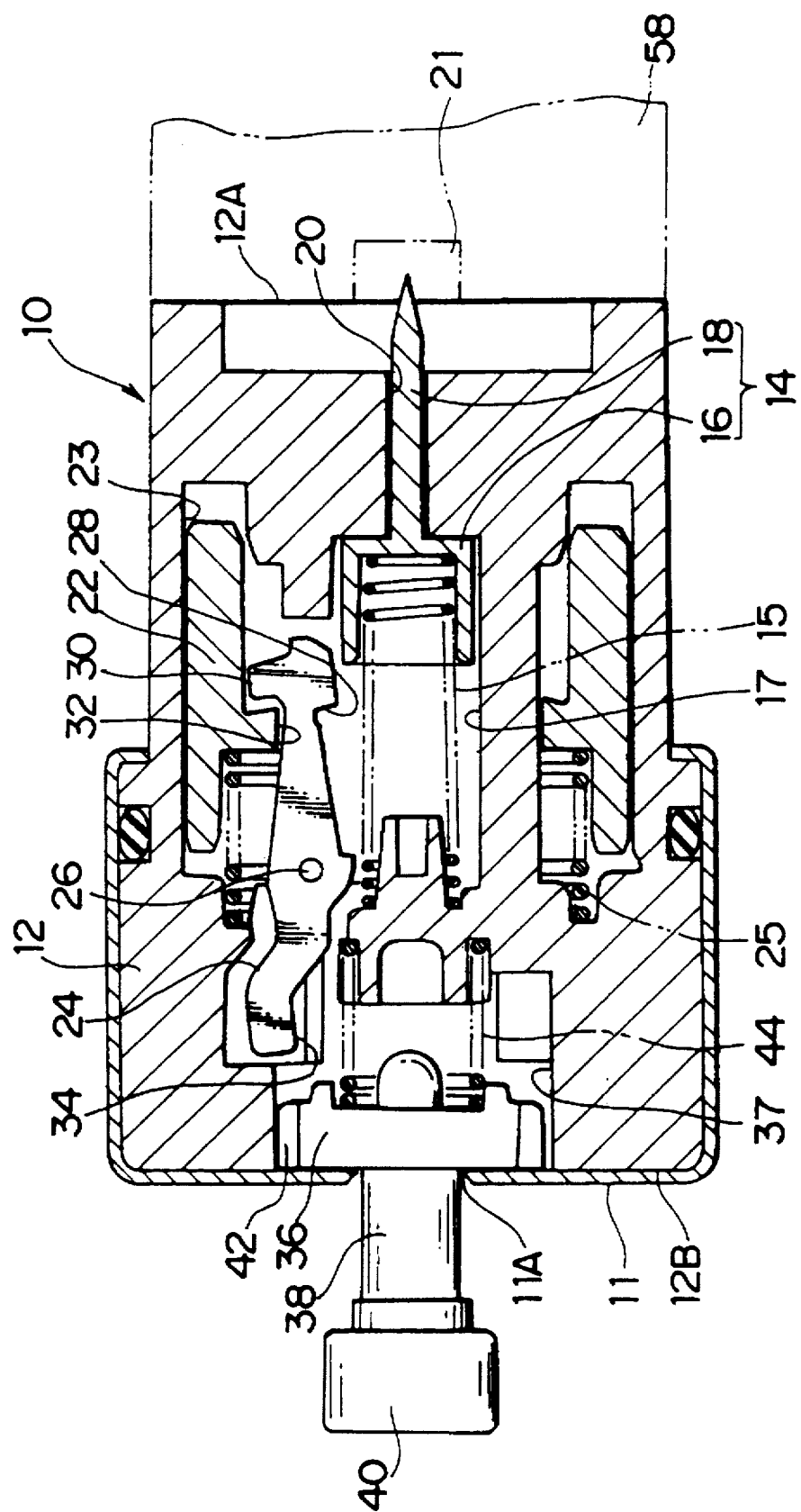
FIG. 3 is a cross-sectional view depicting the state in which the mechanical ignition system sensor shown in FIG. 1 is activated so as to ignite a detonator.

FIGS. 1 through 3 are respectively schematic cross-sectional views showing the structure of a mechanical ignition system sensor 10 serving as an acceleration sensor according to a first embodiment of the present invention.

The mechanical ignition system sensor 10 has a cylindrical case 12 a part of which is covered by a cover 11. An ignition pin 14 is provided in a sliding hole 17 defined in the case 12. The ignition pin 14 comprises a main body 16 shaped substantially in the form of a cylinder and a projected portion 18 which integrally projects from a bottom wall of the main body 16. The ignition pin 14 is slidable within the case 12 along an axial direction thereof. When the ignition pin 14 (main body 16) is moved to a bottom wall 12A of the case 12 as shown in FIG. 3, the projected portion 18 of the ignition pin 14 projects outwards through an aperture 20 defined in the case 12. As a result, the projected portion 18 strikes against a detonator 21 so as to ignite it. The ignition pin 14 is normally urged in the direction of the detonator 21 by a firing spring 15.

Further, an inertial mass body 22 is disposed within the case 12. The inertial mass body 22 is shaped substantially in the form of a cylinder and is movably accommodated within a sliding hole 23 provided close to a peripheral cylindrical wall of the case 12. The inertial mass body 22 is normally urged in the direction of the bottom wall 12A by a bias spring 25.

A trigger lever 24 is disposed between the inertial mass body 22 and the ignition pin 14 as shown in FIG. 1. The inertial mass body 22, the trigger lever 24 and the ignition pin 14 form an inertial movement system wherein the ignition pin 14 produces a mechanical output under the action of an acceleration of a predetermined value or more. Of these, the trigger lever 24 and the ignition pin 14 construct a responsive moving member which responds to the movement of the inertial mass body 22. The trigger lever 24 has a longitudinally-extending intermediate portion rotatably supported by a shaft 26. A leading end portion of the trigger lever 24 is bent toward the ignition pin 14 so as to serve as an engaging portion 28 and is engageable with the main body 16 of the ignition pin 14. Namely, when the trigger lever 24 is rotated about the shaft 26, the engaging portion 28 can approach or separate from the ignition pin 14. When the engaging portion 28 of the trigger lever 24 is brought into engagement with the main body 16 of the ignition pin 14, the ignition pin 14 is held or fixed at the position where the projected portion 18 has receded into the aperture 20 as shown in FIG. 2.

A slide holding portion 30 projects toward the inertial mass body 22 on the side opposite to the engaging portion 28 provided near the leading end portion of the trigger lever 24. The slide holding portion 30 corresponds to a slide portion 32 formed in the inertial mass body 22 and is constructed so as to be held in contact with the slide portion 32. Namely, the inertial mass body 22 is normally located at a position closest to the bottom wall 12A of the case 12 by an urging force of the bias spring 25. In this condition, the slide portion 32 of the inertial mass body 22 contacts the slide holding portion 30 of the trigger lever 24 as shown in FIG. 1. The engaging portion 28 of the trigger lever 24 is brought into engagement with the main body 16 of the ignition pin 14 so that the ignition pin 14 is held at the position where the projected portion 18 thereof has receded into the aperture 20. Further, when the inertial mass body 22 is moved away from the bottom wall 12A, the slide portion 32 of the inertial mass body 22 is relatively moved while being held in sliding contact with the slide holding portion 30 of the trigger lever 24. When the slide portion 32 is separated from the trigger lever 24, the trigger lever 24 is rotated counterclockwise as shown in FIG. 1 so that the engaging portion 28 is separated from the main body 16 of the ignition pin 14.

On the other hand, a lock lever 36 is disposed within a circular hole 37 coaxially defined in the case 12 in the vicinity of a rear end 34 (an end provided on the side opposite to the engaging portion 28) of the trigger lever 24.

The lock lever 86 is shaped in the form of a disc. A shaft 38 is integrally fixed to an axial portion of the lock lever 36 and a pressing portion 40 is provided at a free end of the shaft 38. The shaft 38 is placed on the same axis as that of the ignition pin 14 and is supported by a shaft hole 11A defined in the cover 11 of the case 12 so that the lock lever 36 can move in the axial direction and is rotatable about the axis. The pressing portion 40 protrudes outwards from the cover 11.

Figure 4:
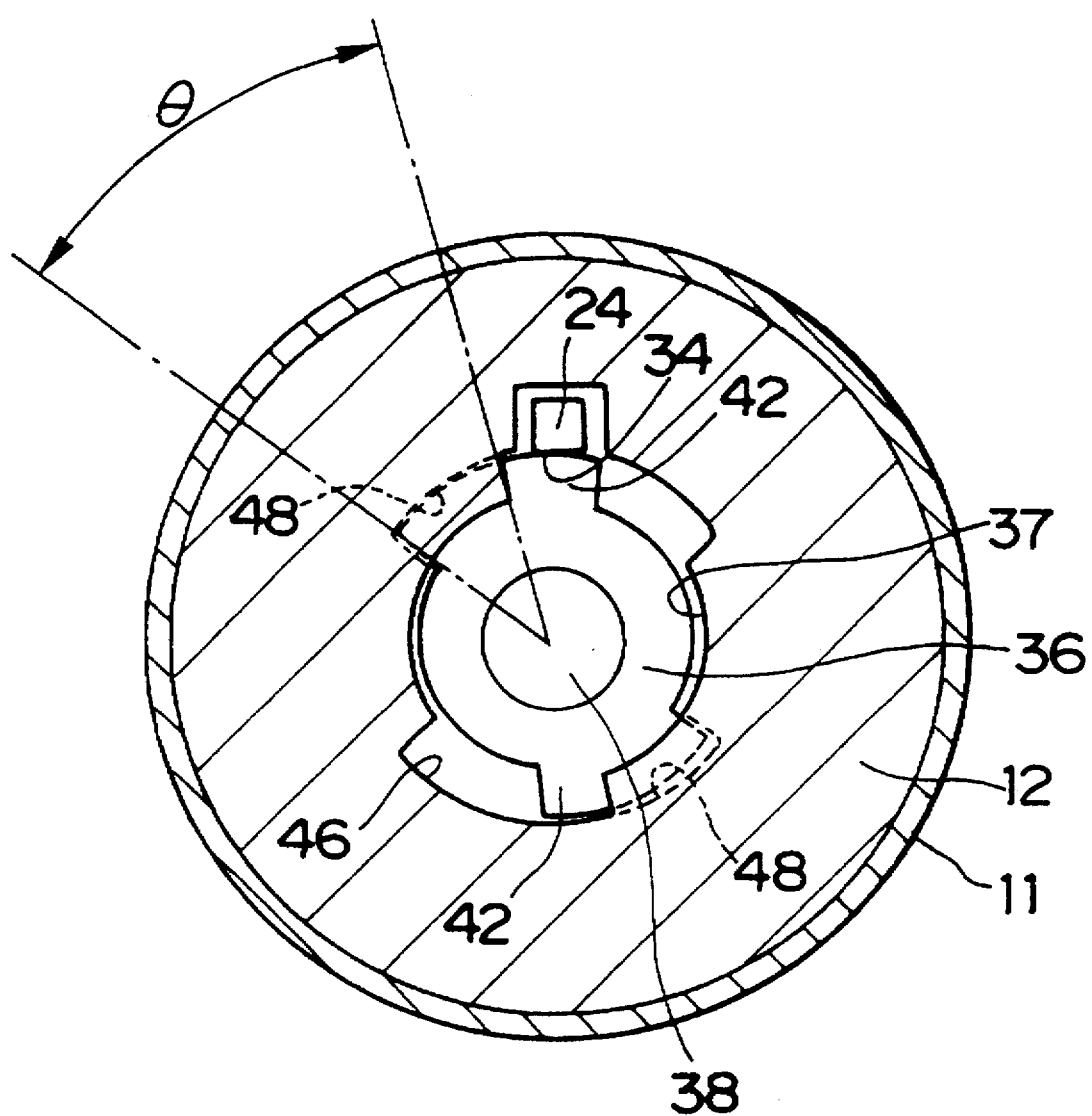
FIG. 4 is a cross-sectional view showing the state in which a lock lever corresponding to a cross section taken along line 4—4 of FIG. 2 is brought into engagement with a convex portion.
Figure 5:
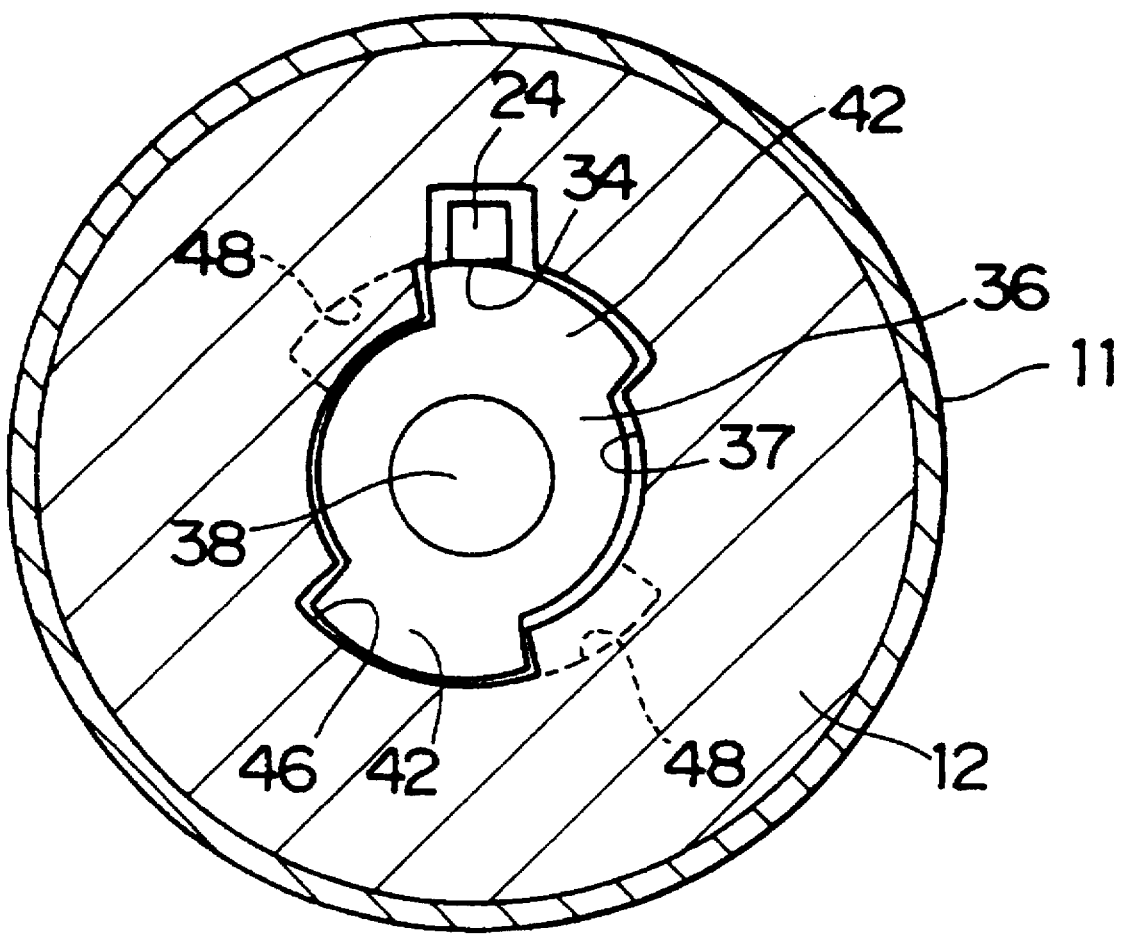
FIG. 5 is a cross-sectional view illustrating the manner in which the lock lever of a mechanical ignition system sensor taken along line 4—4 overlaps a concave portion of a case body so as to be released from being held by the convex portion.

As shown in FIGS. 4 and 5, holding portions 42 are respectively shaped in the form of fans so as to project in the radial direction from opposed outer peripheral portions of the lock lever 38 with the axis thereof interposed therebetween. Further, the holding portions 42 are respectively accommodated in a pair of large-diameter portions 48 of the circular hole 37 so as to be slidable in the axial direction. When the lock lever 36 is moved in the axial direction so as to approach the trigger lever 24, either one of the holding portions 42 is brought into engagement with the rear end 34 of the trigger lever 24 as shown in FIG. 2. When the holding portion 42 engages the rear end 34 of the trigger lever 24, the trigger lever 24 is prevented from being rotated about the shaft 26. On the other hand, when the lock lever 36 is moved in the axial direction (i.e., in the reverse direction) so that the holding portion 42 is separated from the rear end 34 of the trigger lever 24, the rear end 34 of the trigger lever 24 is released from being held by the holding portion 42 as shown in FIG. 1, thereby enabling the trigger lever 24 to be rotated about the shaft 26.

Further, a return spring 44 is provided on the lock lever 36 side of the ignition pin 14 and normally urges the lock lever 36 in the direction of a bottom wall 12B of the case 12 (i.e., in the direction in which the holding portion 42 is spaced away from the rear end 34 of the trigger lever 24).

Furthermore, a pair of cut concave portions 48 is provided at parts of the circular hole 37 so as to correspond to the periphery of the lock lever 36 as in the state shown in FIG. 2. The inside diameter of each concave portion 48 is identical in inside diameter to the large-diameter portion 46. The concave portions 48 can hold the holding portions 42 therein by rotating the lock lever 36 in a counterclockwise direction from the state shown in FIG. 5. When the lock lever 36 enters the cut concave portions 48, the lock lever 36 is held in a state of approaching the trigger lever 24 by wall surfaces 48A of the cut concave portions 48, which are provided near the bottom wall 12B, irrespective of an urging force of the return spring 44. On the other hand, when the shaft 38 of the lock lever 36 is rotated in the clockwise direction as seen in FIG. 4 by an external operation so that the lock lever 36 is rotated a predetermined angle θ (about 45° in the present embodiment), the holding portions 42 are separated from the cut concave portions 48 so as to return to the large-diameter portions 46 as shown in FIG. 5. Thus, the lock lever 36 is moved in the axial direction (to the bottom wall 12B side) by the urging force of the return spring 44 so that the corresponding holding portion 42 is separated from the rear end 34 of the trigger lever 24. As a result, the rear end 34 of the trigger lever 24 is released from being held by the corresponding holding portion 42 as shown in FIG. 1, thereby enabling the trigger lever 24 to rotate about the shaft 26.

Figure 6:
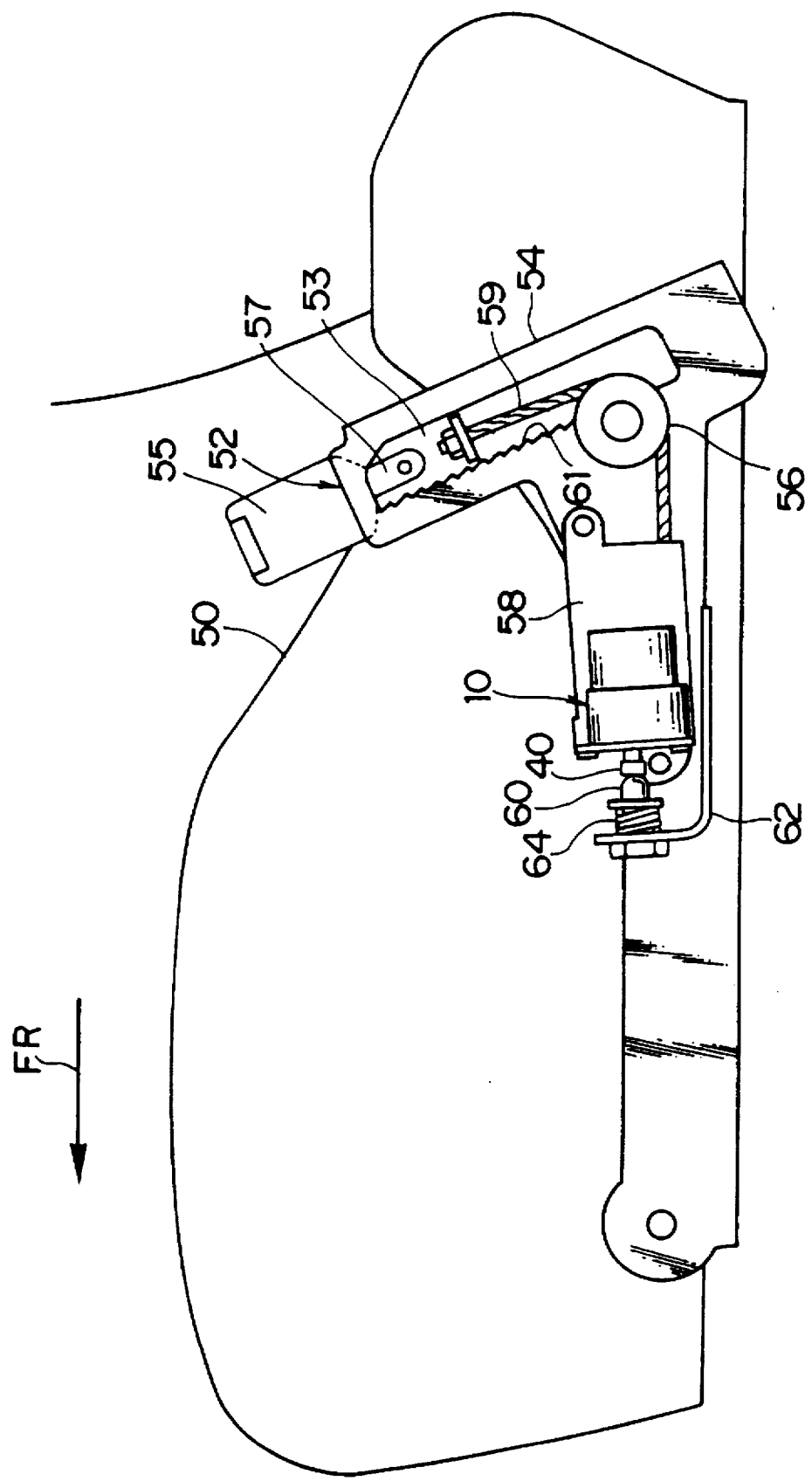
FIG. 6 is a side view showing the state of attachment of the mechanical ignition system sensor to a vehicle seat.

As shown in FIG. 6, the mechanical ignition system sensor 10, constructed as described above, is incorporated into a gas generator 58 for a pretensioner 52 mounted to a vehicle seat 50 slidable along the longitudinal direction of the vehicle. Further, the mechanical ignition system sensor 10 normally moves together with the vehicle seat 50. An unillustrated gas generating material and a detonator 21 (see FIGS. 1 through 3) for igniting and combusting the gas generating material are accommodated in the gas generator 58. The pretensioner 52 has a gas generator 58 and a frame 54 secured to the vehicle seat 50. A lock plate 53 is mounted to the frame 54 so as to be slidable along the vertical and longitudinal directions of the frame 54. An anchor 57 of a buckle 55 is fastened to the lock plate 53 and one end of a pulling wire 59 is coupled to the lock plate 53. The other end of the pulling wire 59 is wound around a pulley 56, so as to change the direction of the wire and coupled to a piston of an unillustrated cylinder mounted to the gas generator 58.

Next, the wire 59 is drawn by the movement of the piston with the cylinder by gas generated from the gas generator 58 so that the lock plate 53 is pulled downward toward the pulley 56 of the frame 54 together with the buckle 55. Thus, when the buckle 55 is pulled downward, a webbing secured to an occupant in the seat is subjected to a pulling force through a tongue plate (not shown) brought into engagement with the buckle 55 so that a tension is exerted on the webbing.

Incidentally, a gear teeth 61 is used for a detent latch mechanism of the lock plate 53.

Figure 7:
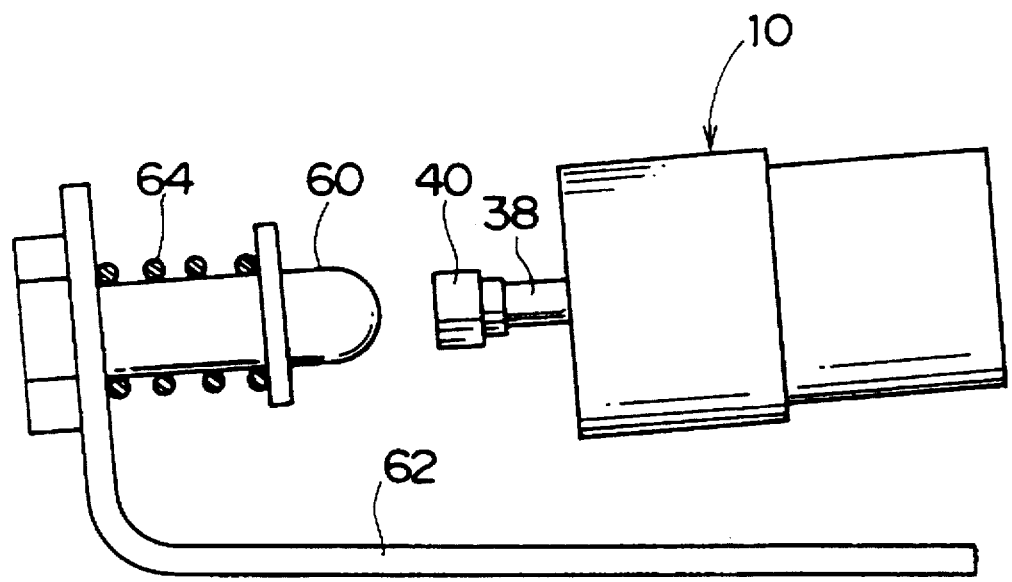
FIG. 7 is a side view illustrating a corresponding relationship between the mechanical ignition system sensor shown in FIG. 1 and the lock pin.
Figure 8:
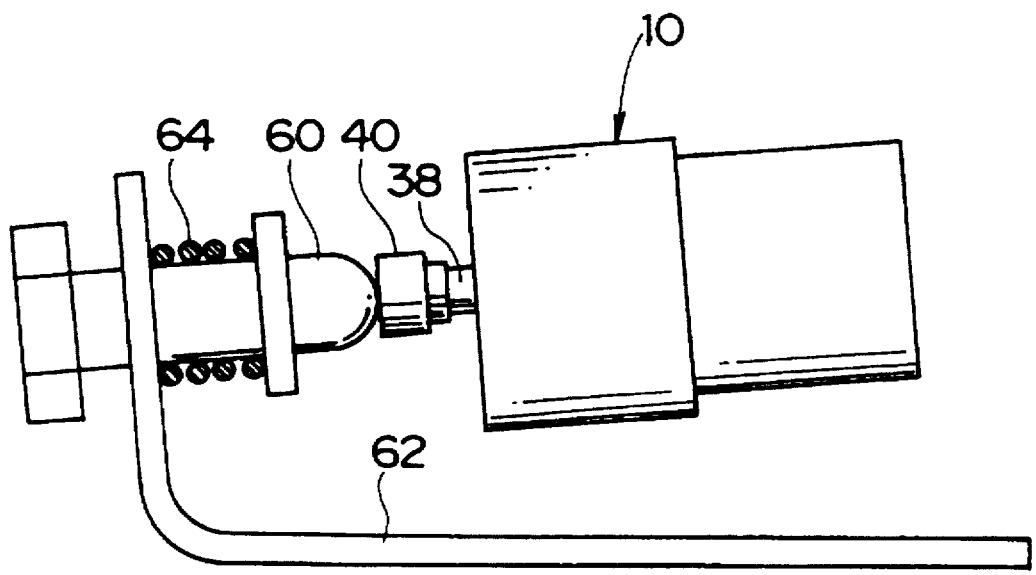
FIG. 8 is a side view depicting the state in which the mechanical ignition system sensor shown in FIG. 1 is brought into engagement with the lock pin shown in FIG. 2.
Figure 9:
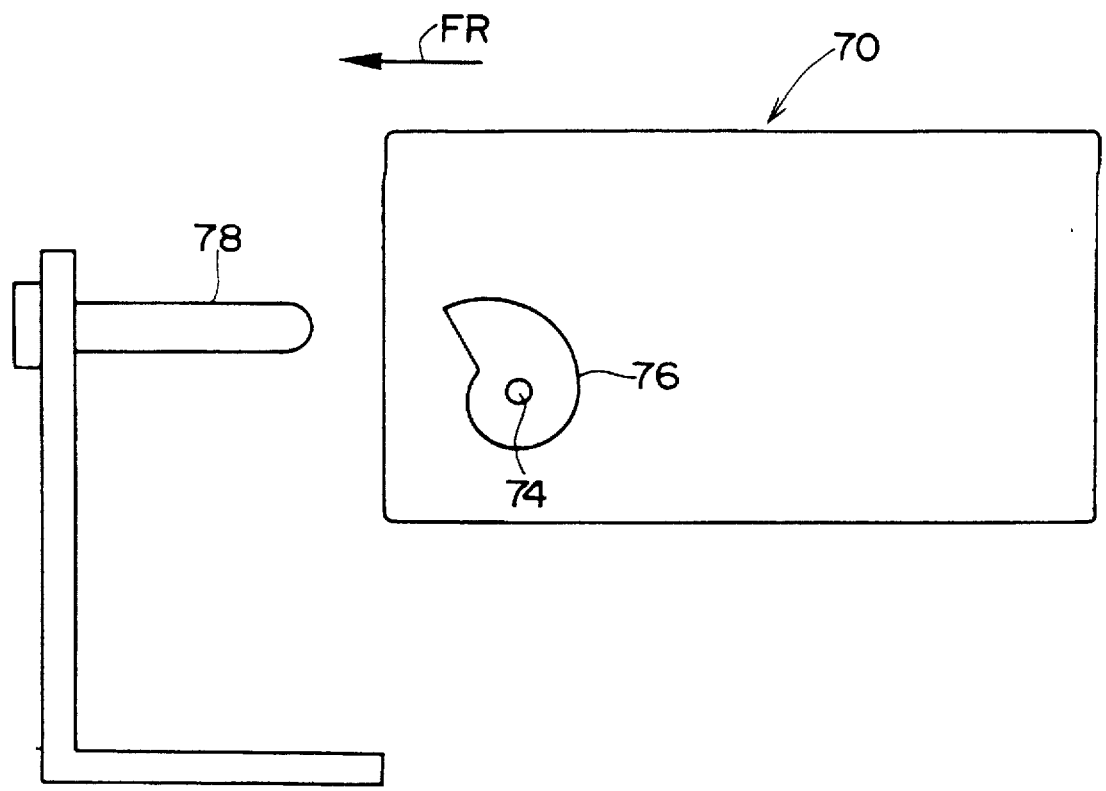
FIG. 9 is a side view showing a corresponding relationship between a mechanical ignition system sensor according to a second embodiment of the present invention and a lock pin.
Figure 10:
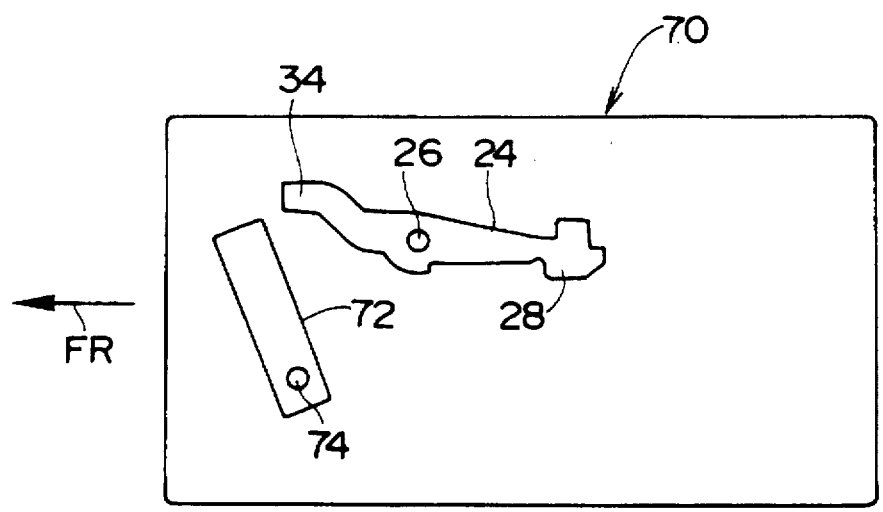
FIG. 10 is a side view illustrating a corresponding relationship between a lock lever and a trigger lever both employed in the mechanical ignition system sensor shown in FIG. 9.

A lock pin 60 is provided at a predetermined portion of a vehicle corresponding to the position on the vehicle front side at the limit of movement of the seat 50. As shown in FIGS. 7 and 8, the lock pin 60 is supported by a bracket 62 fixed to a vehicle floor or to a member such as a tunnel mounted on the floor or the like, which is provided on the vehicle body side. Further, the lock pin 60 is provided in opposing relationship to the pressing portion 40 so as to be able to contact the pressing portion 40. Thus, when the seat 50 is moved toward the front of the vehicle so as to reach a position near the above limit of movement, the lock pin 60 is brought into contact with the pressing portion 40 so as to press the pressing portion 40 in the axial direction as the seat 50 is slidingly moved further toward the front of the vehicle. As a result, the lock lever 36 approaches the trigger lever 24 so as to engage the rear end 34 of the trigger lever 24.

When the pressing portion 40 of the lock lever 36 is brought into contact with the lock pin 60 and moved in the axial direction so that the lock lever 36 is brought into engagement with the rear end 34 of the trigger lever 24, the dimensions of respective parts, such as the amount of movement of the lock lever 36 in the axial direction and the like are set so that the seat 50 reaches the position on the vehicle frontal end at the limit of movement of the seat 50.

A coil spring 64 is wound around the lock pin 60 so as to be able to absorb both an impact developed when the pressing portion 40 of the lock lever 36 engages the lock pin 60 and variations in the stop position of the vehicle seat.

The arrow in the drawings, FR, indicates the front of the vehicle.

(Operation of first embodiment)

Operation of the first embodiment will now be described below.

In the mechanical ignition system sensor 10 according to the first embodiment, which has been constructed as described above, the ignition pin 14 is normally located at a position where it is separated from the detonator 21 due to the urging force as shown in FIG. 1. The trigger lever 24 is brought into engagement with the main body 16 of the ignition pin 14 so as to hold the ignition pin 14. Further, the inertial mass body 22 enters a position closest to the bottom wall 12A, i.e., a locus of swinging movement of the trigger lever 24. Thus, the slide portion 32 is brought into contact with the slide holding portion 30 of the trigger lever 24 to thereby prevent the trigger lever 24 from rotating so that the trigger lever 24 is placed in a state in which the ignition pin 14 is held.

Now, the lock lever 36 approaches the trigger lever 24 against the urging force of the return spring 44 as shown in FIG. 2 when the safety device is in operation (the sensor is brought into a state of being incapable of being actuated). As a result, either one of the holding portions 42 is brought into engagement with the rear end 34 of the trigger lever 24 so that the trigger lever 24 is prevented from rotating about the shaft 26. In this condition, the lock lever 36 is turned in the counterclockwise direction as shown in FIG. 4 so that the holding portions 42 enter their corresponding cut concave portions 48. As a result, the lock lever 36 is held in a state of approaching the trigger lever 24 irrespective of the urging force of the return spring 44. Thus, even if a rapid acceleration acts on the mechanical ignition system sensor 10 in this condition so that the inertial mass body 22 is inertially moved (even if the slide portion 32 is moved relative to the slide holding portion 30 of the trigger lever 24 so as to be separated from the slide holding portion 30), the trigger lever 24 is not rotated and the ignition pin 14 is not released from being held by the engaging portion 28.

Thus, the mechanical ignition system sensor 10 (i.e., the gas generator 58 and the pretensioner 52) is not actuated before its assembling by mounting the mechanical ignition system sensor 10 to the seat 50 when the safety device is in operation (when the sensor is held in a state of being incapable of being actuated).

After the mechanical ignition system sensor 10 has been mounted to the seat 50, the mechanical ignition system sensor 10 is brought into a state of being capable of being actuated (i.e., the safety device is brought into a released state) as shown in FIG. 1. Namely, when the lock lever 36 is rotated by a predetermined angle θ in the clockwise direction from the state shown in FIG. 4, the holding portions 42 are drawn out from the cut concave portions 48 so as to be opposed to the large-diameter portion 46. Thus, the lock lever 36 is moved in the axial direction (to the bottom wall 12B side) by the urging force of the return spring 44 so that one of the holding portions 42 is separated from the rear end 34 of the trigger lever 24, thereby releasing the rear end 34 of the trigger lever 24 from being held by the corresponding holding portion 42. Thus, the trigger lever 24 can be rotated about the shaft 26 so that the safety device is brought into a state of being incapable of being actuated (i.e., the sensor is brought into the state of being capable of being actuated).

When a large acceleration acts on the mechanical ignition system sensor 10 in this condition, the inertial mass body 22 is inertially moved as shown in FIG. 3 so as to be separated from the locus of the swinging movement of the trigger lever 24. When the slide holding portion 30 of the trigger lever 24 is moved away from the slide portion 32 of the inertial mass body 22 so that the slide portion 32 is released from being held by the slide holding portion 30, the ignition pin 14 presses the engaging portion 28 upward under the urging force of the firing spring 15 so that the trigger lever 24 is rotated in the direction of moving away from the ignition pin 14. Thus, the engaging portion 28 of the trigger lever 24 is separated from the main body 16 of the ignition pin 14 so that the ignition pin 14 is released from being held. Further, the ignition pin 14 is moved in the axial direction by the urging force of the firing spring 15 so that the projected portion 18 projects outwards. As a result, the projected portion 18 of the ignition pin 14 collides with the detonator 21 so as to ignite the detonator 21. When the detonator 21 is ignited, the gas generating material of the gas generator 88 is ignited so as to combust thereby actuating the pretensioner 52.

On the other hand, when the seat 50 reaches the position near to the vehicle frontal side within the limit of movement of the seat 50 where the occupant slides the seat 50 in the longitudinal direction of the vehicle to adjust the position of the seat when the vehicle is in a normal running state, the lock pin 60 attached to the vehicle body is brought into contact with the pressing portion 40 of the lock lever 36 so that the lock lever 36 is pressed and moved by the sliding movement of the seat 50 to the position on the vehicle frontal end at the limit of movement of the seat 50. As a result, one of the holding portions 42 of the lock lever 36 is brought into engagement with the rear end 34 of the trigger lever 24 again (see the states shown in FIGS. 2 and 8). Thus, the trigger lever 24 is brought into a state of being prevented from rotating about the shaft 26 again. Therefore, the seat 50 reaches the position on the vehicle frontal end at the limit of movement of the seat 50 and suddenly stops moving. Even if a rapid acceleration acts on the mechanical ignition system sensor 10 due to the sudden stop operation of the seat 50, the trigger lever 24 is not rotated and hence the mechanical ignition system sensor 10 is deactivated.

Since the coil spring 64 is wound around the lock pin 60, the impact developed when the pressing portion 40 of the lock lever 36 engages the lock pin 60 can be smoothly absorbed and unnecessary external forces can be prevented from acting on the respective parts.

In the mechanical ignition system sensor 10 according to the first embodiment, the shaft 38 of the disc-shaped lock lever 36 is placed on the same axis as that of the ignition pin 14 and is supported so as to move in the axial direction and be rotatable about the axis. Further, when the pressing portion 40 is pressed by the lock pin 60, the lock lever 36 is moved in the axial direction so as to engage the rear end 34 of the trigger lever 24. However, the direction of movement of the lock lever in the axial direction at the time that the lock lever 36 engages the rear end 34 of the trigger lever 24 and its pressing method are not necessarily limited to those referred to above. The present invention is not necessarily limited to a method of restraining the movement of the trigger lever 24 when it is desired to deactivate the mechanical ignition system sensor 10. A method of restraining any of the inertial mass body 22, the trigger lever 24 or the ignition pin 14 may be used as an alternative. The trigger lever 24 and the ignition pin 14 act as the responsive moving member.

(Structure and operation of second embodiment)

A mechanical ignition system sensor 70 shown in FIGS. 9 through 12 as an illustrative example may be constructed such that a lock lever 72 thereof is supported by a shaft 74 and is brought into engagement with a rear end 34 of a trigger lever 24 by the rotation of the shaft 74. In this case, a leading end portion of the shaft 74 projects outwards from a case 12 and an operation lever 76 is mounted to the leading end portion thereof.

Figure 11:
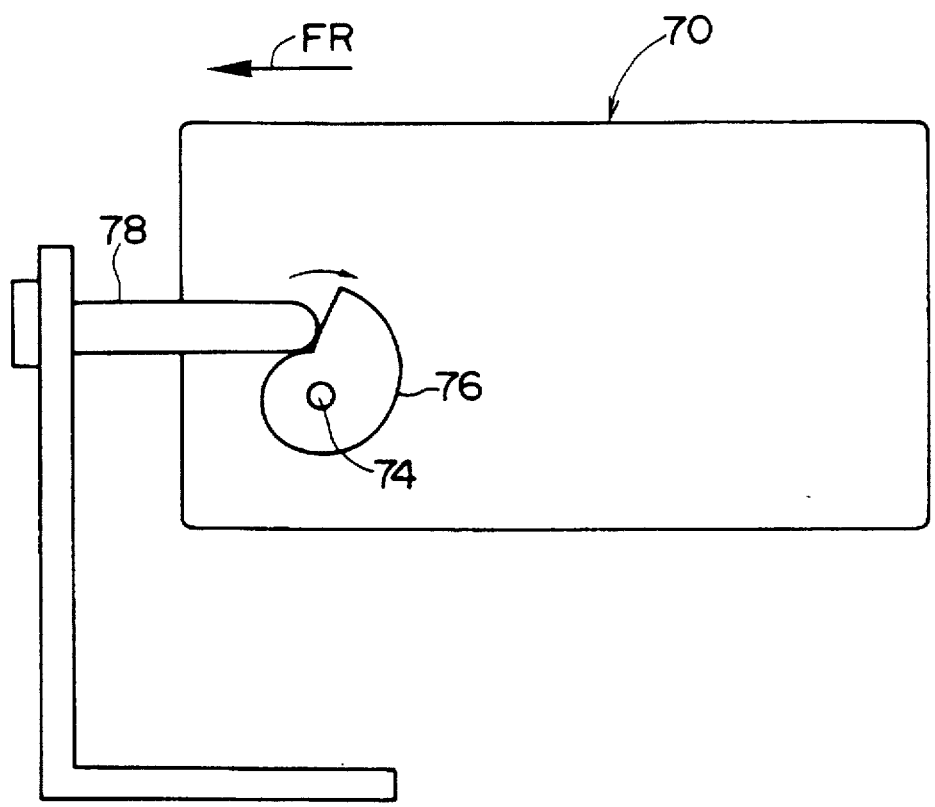
FIG. 11 is a side view showing the manner in which the mechanical ignition system sensor shown in FIG. 8 is brought into engagement with the lock pin and corresponding to FIG. 8.
Figure 12:
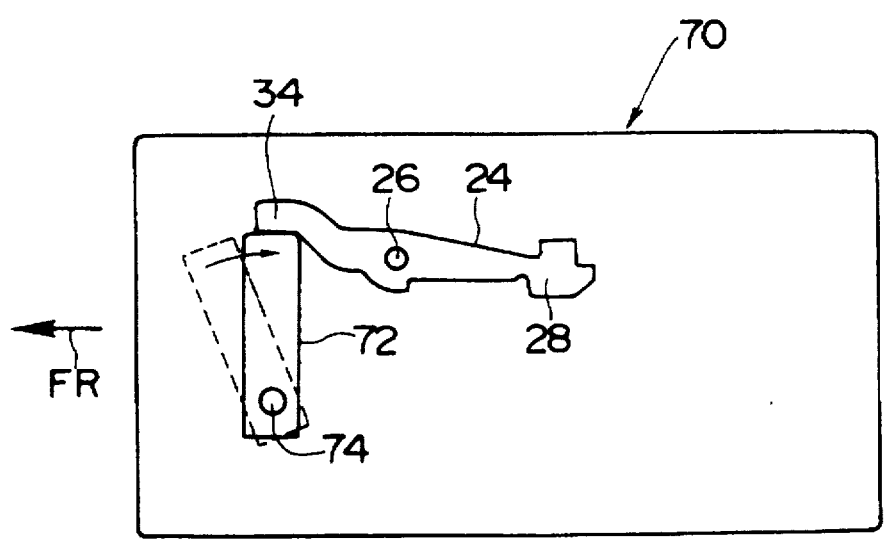
FIG. 12 is a side view illustrating the manner in which the lock lever shown in FIG. 10 is brought into engagement with the trigger lever and corresponding to FIG. 10.

Even in the case of the mechanical ignition system sensor 70, when a seat is slidingly moved to the position on the vehicle frontal end at the limit of movement of the seat, the operation lever 76 is pressed by a lock pin 78 so that the lock lever 72 is rotated together with the shaft 74 as shown in FIG. 11. As a result, an upper end of the lock lever 72 is brought into engagement with the rear end 34 of the trigger lever 24. Thus, the trigger lever 24 is brought into a locked state of being prevented from rotating about the shaft 26. Even if the seat reaches the above position so as to abruptly stop moving and a rapid acceleration acts on the mechanical ignition system sensor 70, the trigger lever 24 is not rotated and hence the mechanical ignition system sensor 70 is prevented from malfunctioning.

(Structure of the third embodiment)

Figure 13:
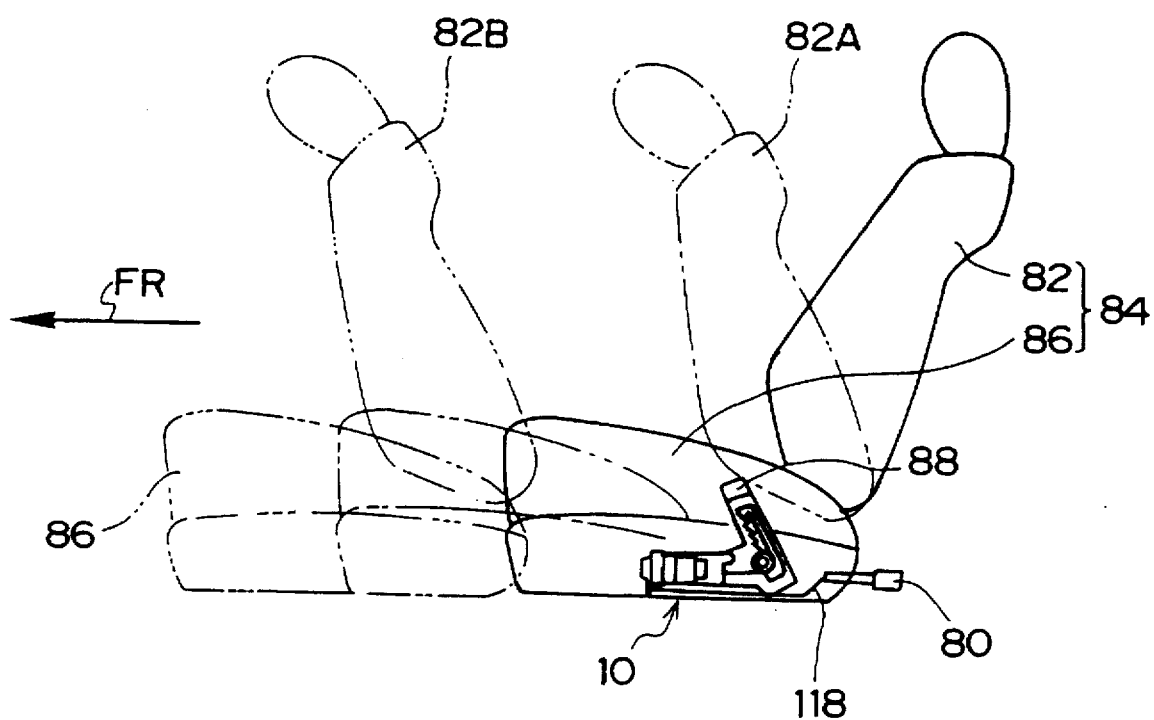
FIG. 13 is a schematic side view showing a walk-in operated seat to which a mechanical ignition system sensor according to a third embodiment of the present invention is mounted and is a view for describing the operation of the walk-in activated seat.

FIG. 13 illustrates a walk-in operated seat to which a mechanical ignition system sensor according to a third embodiment of the present invention is mounted. The walk-in type seat is used for each of front seats of a two-door type vehicle. When an occupant takes or leaves a rear seat of the two-door vehicle, the walk-in type seat is used for tilting a seatback 82 toward the front of the vehicle by pressing a walk-in pedal 80 (see 82A), and then moving the entire seat 84 to the farthest forward or frontal position, as indicated by a phantom line in the drawing, by an urging force of a spring or the like. The getting in and out operation of the occupant is thereby facilitated.

Figure 14:
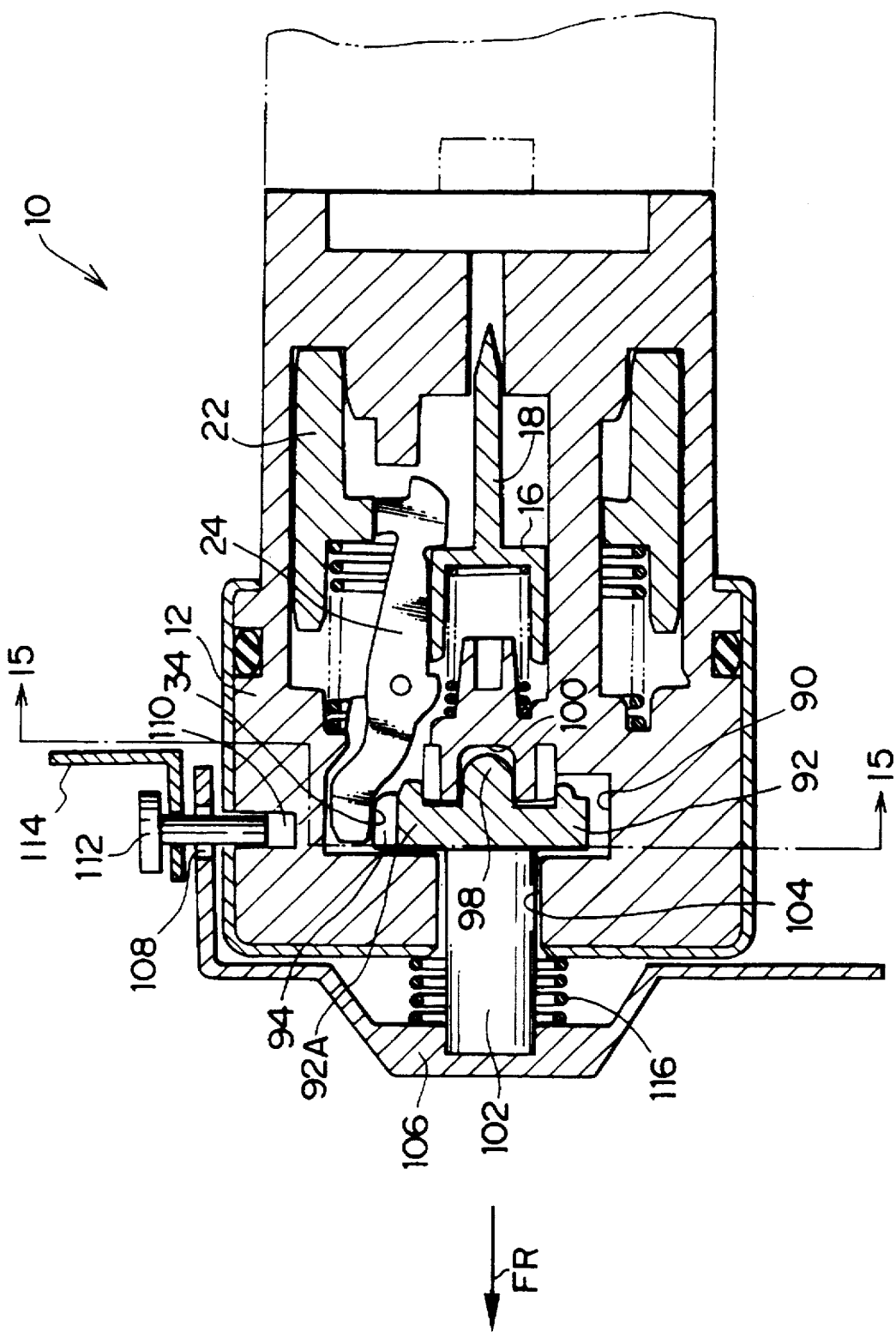
FIG. 14 is a cross-sectional view illustrating a mechanical ignition system sensor according to a fourth embodiment of the present invention.
Figure 15:
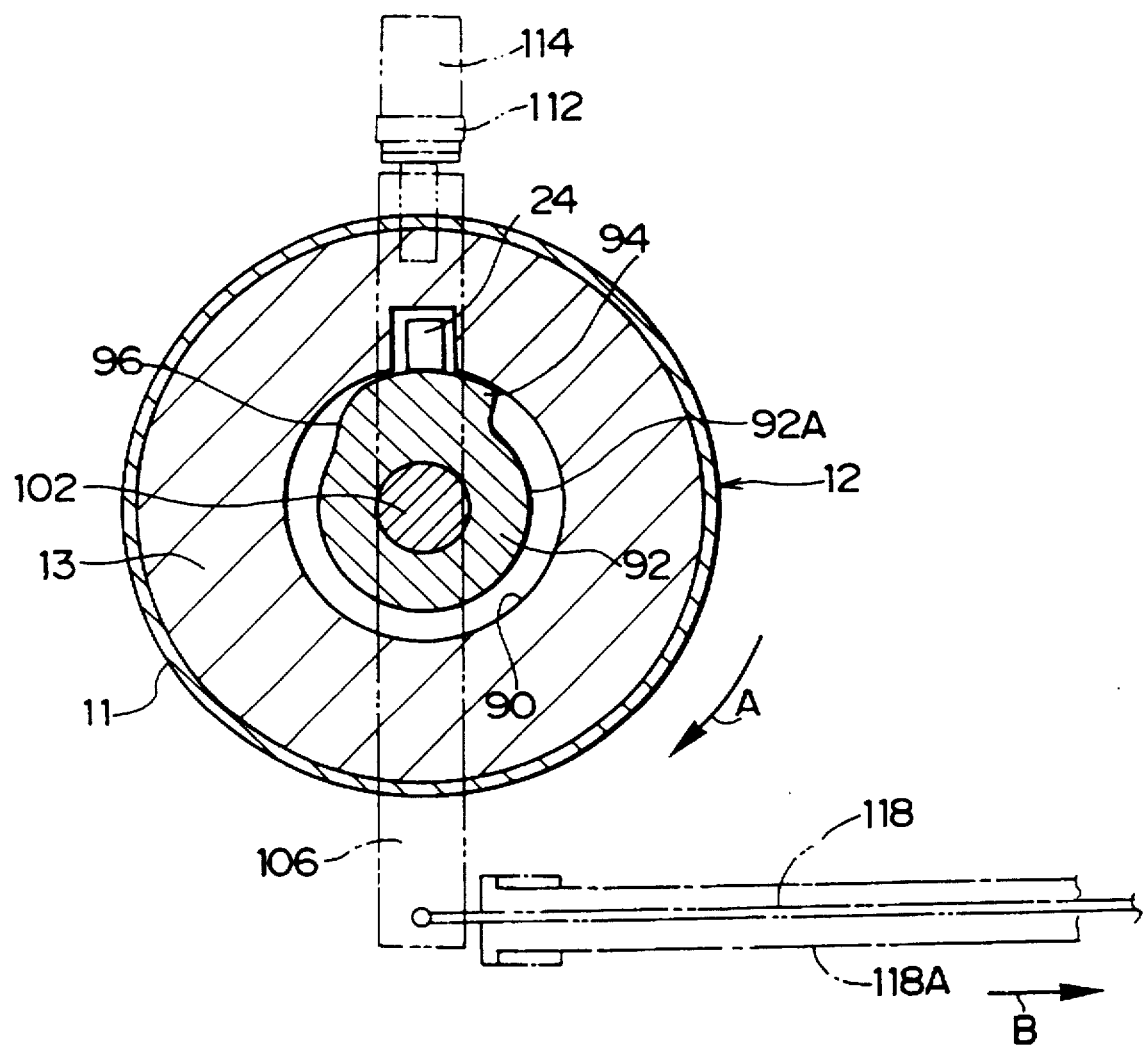
FIG. 15 is a cross-sectional view corresponding to a cross section taken along line 15—15 of FIG. 14 showing the manner in which the mechanical ignition system sensor shown in FIG. 14 is placed in a state of being incapable of being actuated.
Figure 16:
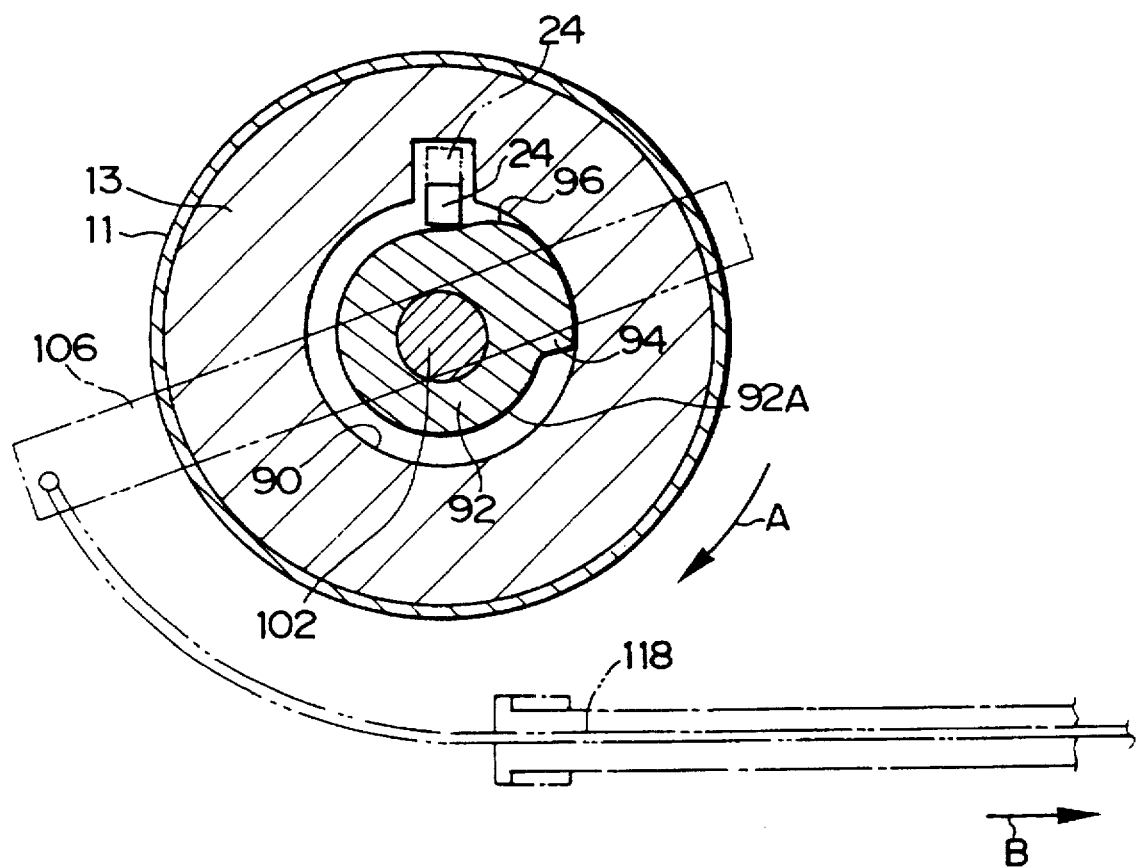
FIG. 16 is a cross-sectional view corresponding to the cross section taken along line 15—15 of FIG. 14 and showing the state in which the mechanical ignition system sensor shown in FIG. 14 is brought into a state of being capable of being actuated.

The present third embodiment is similar to the first embodiment in the sense that a mechanical ignition system sensor 10 and a generator 58 are provided along the side of a seat cushion 86. The present embodiment used in this way is obtained by changing the structure of the lock lever 36 of the safety mechanism employed in the first embodiment. Namely, a lock lever 92 is rotatably mounted in a circular hole 90 provided at a position corresponding to a rear end 34 of a trigger lever 24 provided within a case 12 as shown in FIG. 14. The lock lever 92 is shaped substantially in the form of a plate cam and has a holding projection 94 formed by having a part of a base circumference 92A project in the radial direction as shown in FIGS. 15 and 16. A guide oblique side 96, which smoothly rises from the base circumference 92A and is connected to the holding projection 94, is formed in a portion of the holding projection 94 on the left side as seen in the drawing.

A shaft head 98, which extends in the axial direction from an end surface of the lock lever 92, is supported in a shaft hole 100 defined in the case 12. A shaft bar 102 is provided along the axis so as to project from an end surface of the lock lever 92, which is provided on the side opposite to the shaft head 98. The shaft bar 102 is supported in a shaft support hole 104 defined in the case 12. An interlocking lever 106 is fixed to a free end of the shaft bar 102. The interlocking lever 106 is shaped in the form of a bent and elongated plate and has an intermediate portion fixed to the shaft bar 102. A torsion coil spring 116 is fit on the shaft bar 102. Further, one end of the torsion coil spring 116 is fixed to the interlocking lever 106 and the other end thereof is fixed to the case 12. In this condition, the interlocking lever 106 is urged so as to rotate in a lock-releasing direction indicated by arrow A in FIGS. 15 and 16. One end of the interlocking lever 106, which is provided on the upper side in the drawing, is formed in a bent state so as to extend along the outside of the case 12. Further, an aperture 108 (see FIG. 14) is defined in a predetermined position of the one end of the interlocking lever 106 as a part of an engaging means. With the aperture 108 defined therein, a fixed hole 110, which serves as an engaging means, is defined in an outer peripheral portion of the case 12 so as to correspond to the aperture 108. To prevent the mechanical ignition system sensor 10 from malfunctioning before it is mounted to the seat 84, a safety pin 112, which serves as an engaging means, is caused to pass through the aperture 108 so as to be fit in the fixed hole 110. Further, the interlocking lever 106 is prevented from being moved by an urging force of the torsion coil spring 116. A handle plate 114 for easily pulling out the safety pin 112 is mounted to the safety pin 112.

Figure 17:
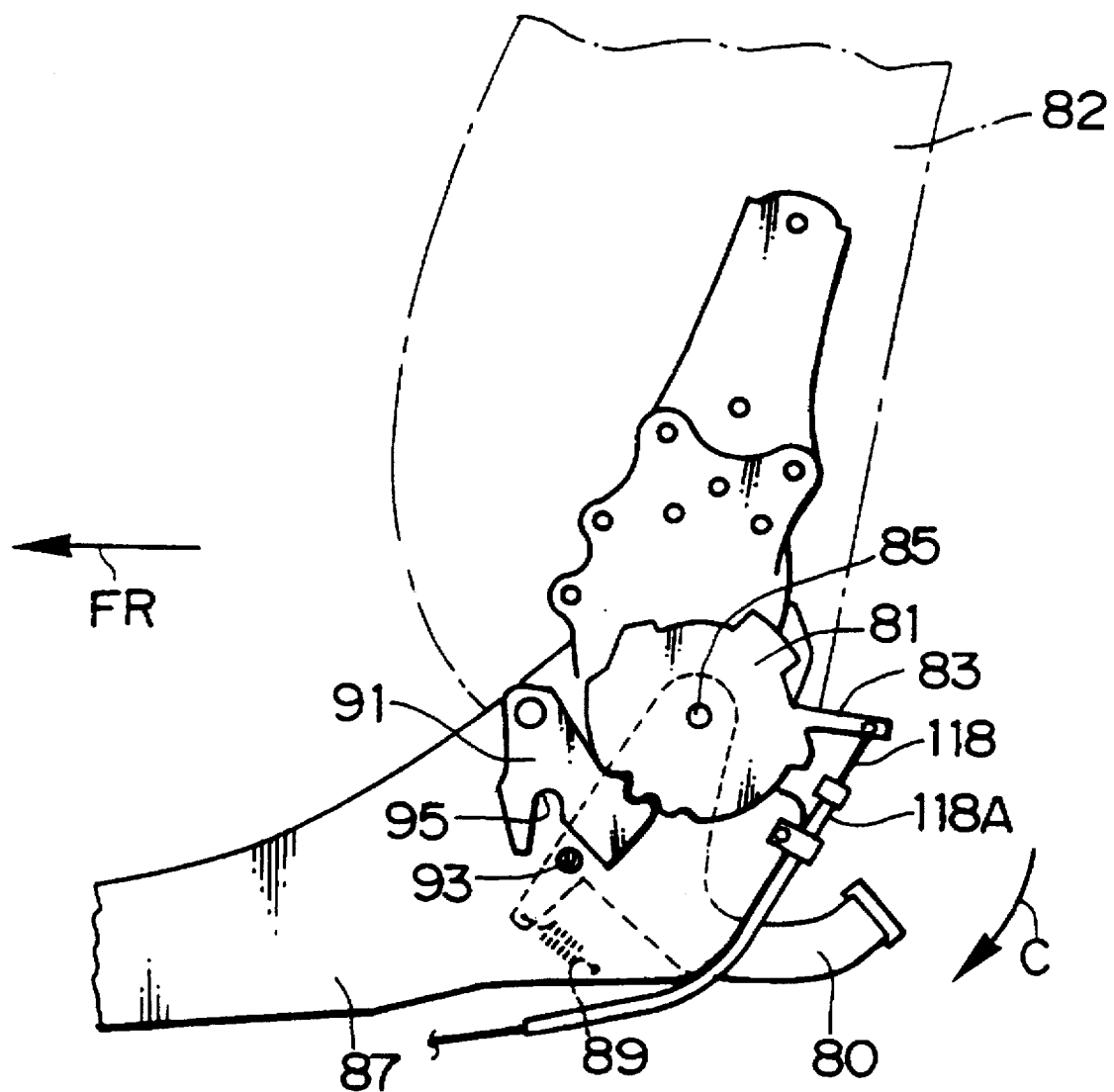
FIG. 17 is a fragmentary schematic side view showing the state of use of a reclining mechanism of the seat employed in the mechanical ignition system sensor shown in FIG. 13.
Figure 18:
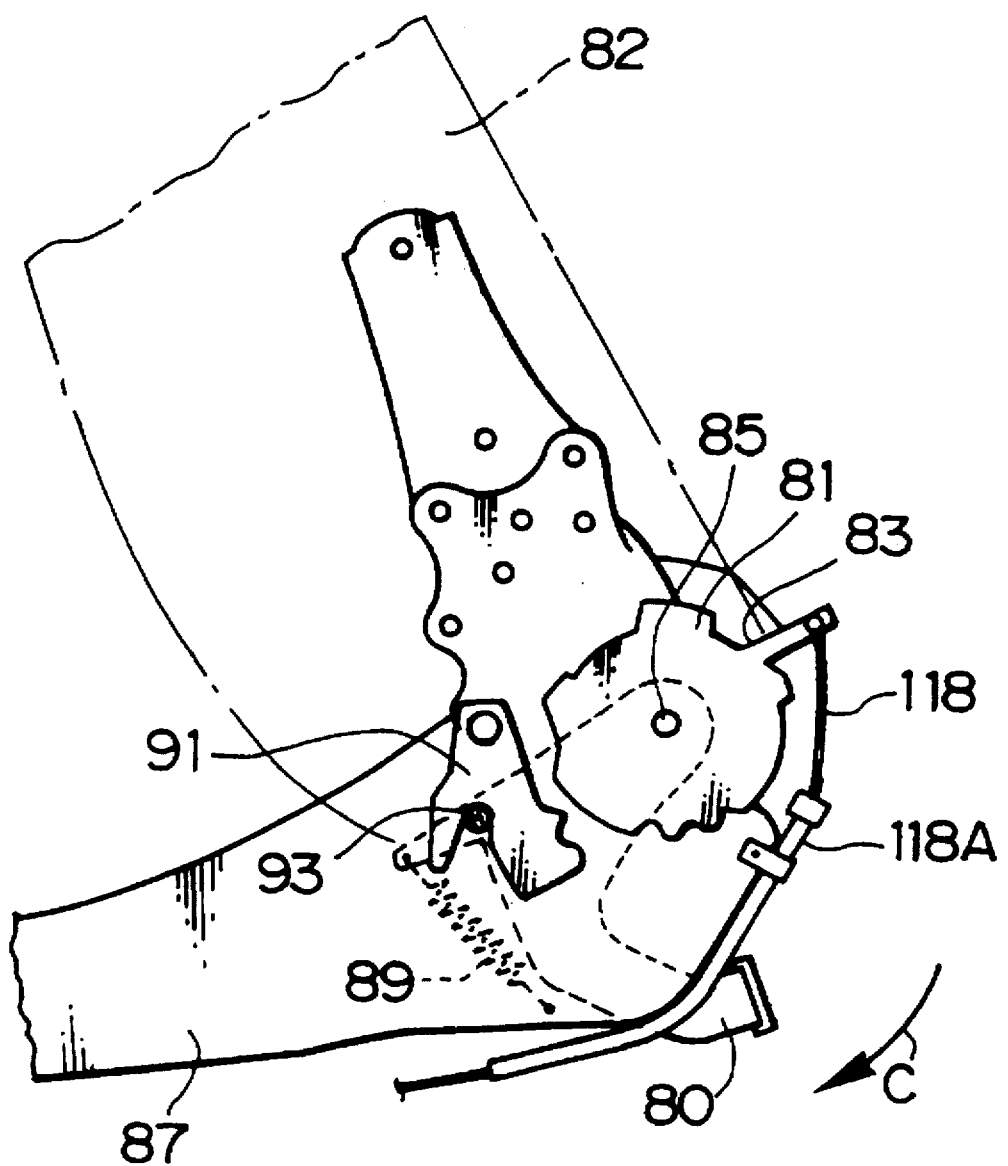
FIG. 18 is a fragmentary schematic side view showing the state of walk-in operation of the reclining mechanism shown in FIG. 17.

One end of a connecting wire 118 is connected to the other end of the interlocking lever 106 as a part of an interlocking means as shown in FIGS. 15 and 16. The other end of the connecting wire 118 is connected to a support plate 83 of an outer gear 81 employed in a reclining device of the seat 84 as shown in FIGS. 17 and 18. The connecting wire 118 is inserted into a wire cover 118A so as to be able to transfer a compressive force and a tensile force in the longitudinal direction thereof.

The outer gear 81 employed in the reclining device of the seat 84 is fixed to and integrally rotates with the seatback 82. A base end of a walk-in pedal 80 is supported by a rotatable shaft 85 of the outer gear 81 as shown in FIGS. 17 and 18. The base end is urged in the direction opposite to the direction indicated by arrow C by an urging force of a tensile coil spring 89 fixed to one end of a frame 87 of the seat 84.

Further, a pawl 91 is supported by the seat frame 87 and the teeth of the pawl 91 mesh with the teeth of the outer gear 81 so that the outer gear 81 does not rotate. The pawl 91 is urged in the direction of meshing with the outer gear 81 by an unillustrated spring or a fixing structure. Further, the pawl 91 is moved away from the outer gear 81 by the operation of an unillustrated reclining lever so as to change the engagement position with the outer gear 81, thereby allowing a reclining operation of the seatback 82.

When the walk-in pedal 80 is fully depressed, the walk-in pedal 80 is rotated about the rotatable shaft 85 so that a pin 93 which projects from the walk-in pedal 80 enters a groove 95 defined in the pawl 91. As a result, the pawl 91 is rotated so as to be released from engagement with the outer gear 81. Thus, in order to perform a walk-in operation the outer gear 81 is rotated in the direction opposite to the direction indicated by arrow C in interlock with the operation for tilting the seatback 82 toward the front of the vehicle and thereby pulls the connecting wire 118. The shapes of the walk-in pedal 80 and the pawl 91 and the relationship in position between the two are determined so as to maintain the state shown in FIG. 18 in which the pawl 91 has been separated from the outer gear 81 by fully depressing the walk-in pedal 80. Since its detailed structure is known per se, its detailed description will be omitted. When the seatback 82 is returned to the original usable position, the connecting wire 118 is returned from the withdrawn state to the original state and the walk-in pedal 80 is returned to the original position. As a result, the pawl 91 is also brought into meshing engagement with the outer gear 81.

(Operation of third embodiment)

Operation of the third embodiment will hereinafter be described.

As shown in FIG. 14, the interlocking lever 106 is held in a fixed state by the safety pin 112 as shown in FIG. 14 until the device according to the second embodiment is mounted to the seat 84. This state corresponds to the state shown in FIG. 15. When the holding projection 94 is brought into contact with the rear end 34 of the trigger lever 24, the lock lever 92 holds the trigger pin 24 in an engaged state with the ignition pin 14 placed in a standby position. Thus, since the trigger lever 24 is not released from engagement with the ignition pin 14 even if a rapid acceleration acts on the present device and an inertial mass body 22 is displaced by the acceleration, a detonator 21 can be prevented from being erroneously ignited. It is therefore possible to prevent the present device from malfunctioning when the present device is mounted to the seat 84.

After the present device has been mounted to the seat 84 in the above-described manner, the device is changed from a state of being incapable of being actuated to a state of being capable of being actuated. To this end, an operator holds the handle plate 114 and pulls out the safety pin 112 used as the engaging means. In doing so, the lock lever 92 is rotated in the direction indicated by arrow A by the urging force of the torsion coil spring 116 so that the lock lever 92 is changed from the state shown in FIG. 15 to the state shown in FIG. 16. Now, the end of the connecting wire 118 is coupled to the support plate 83 of the outer gear 81. Since the small-diameter base circumference 92A off the lock lever 92 is placed just below the position off the trigger lever 24 in the state shown in FIG. 16, the rear end 34 of the trigger lever 24 can be moved from a position indicated by the broken line to a position indicated by the solid line as shown in the drawing. Namely, the trigger lever 24 is rotated so as to be released from engagement with the ignition pin 14. Thus, the ignition pin 14 placed in the standby position protrudes so as to collide with the detonator 21, thereby bringing the gas generator into a state of being capable of being actuated.

Next, when the walk-in pedal 80 of the seat 84 shown in FIGS. 13, 17 and 18 is depressed where the present device according to the third embodiment is mounted to the sheet 84 and is placed in a state of being capable of being actuated, the seatback 82 is brought into a walk-in operation by tilting the seatback 82 toward the front of the vehicle. Therefore, the connecting wire 118 serving as the interlocking means, which has been connected to the support plate 83, is pulled in the direction indicated by arrow B in FIG. 16 by the rotation of the support plate 83 of the outer gear 81 shown in FIG. 18. Thus, the lock lever 92 provided integrally with the shaft bar 102 therethrough is rotated in the direction opposite to the direction indicated by arrow A so that the holding projection 94 reaches the position corresponding to the rear end 34 of the trigger lever 24, thereby bringing the lock lever 92 into a state of being incapable of being actuated. As a result, the seat 84 is moved to the farthest frontal position shown in FIG. 13 by the walk-in operation. Even if an acceleration which acts on the present device upon stoppage of the seat 84, increases, the gas generator is not operated.

When the seat 84 is next returned to the in-use position, the seatback 82 is returned to the upright position where it is ready for use. As a result, the support plate 83 of the outer gear 81 is rotated in the direction indicated by arrow C from the position shown in FIG. 18 so as to return to the state shown in FIG. 17. Therefore, the tension of the connecting wire 118 corresponding to the interlocking means connected to the support plate 83 is loosened. As a result, the interlocking lever 106 and the lock lever 92 are rotated in the direction indicated by arrow A from the state shown in FIG. 15 by the urging force of the torsion coil spring 116 so that they are set to a state of being capable of being actuated, which is shown in FIG. 16.

Incidentally, structures, operations and effects other than those described in the third embodiment are identical to those described in the first embodiment.

The interlocking means for operating the interlocking lever 106 employed in the device according to the third embodiment is not necessarily limited to the means using the connecting wire 118 being in interlock with the forward tilting walk-in operation of the seatback 82. Other various interlocking means may be used as an alternative to this means. For example, the connecting wire 118 may be connected to the walk-in pedal 80 so as to be pulled by depressing the walk-in pedal 80.

When the seat 84 is moved toward the farthest frontal position shown in FIG. 13 to perform the walk-in operation, the interlocking means such as the wire or the like may be provided so as to rotate the interlocking lever 106 when the seat 84 has reached a predetermined position.

The present invention is not necessarily limited to the case where the seat belt pretensioner is actuated by the acceleration sensor as described above. The present invention can be widely applied to cases where other objects such as an air bag, etc. to be actuated are operated by the acceleration sensor.

Having now fully described the invention, it will be apparent to those skilled in the art that many changes and modifications can be made without departing from the spirit or scope of the invention as set forth herein.

What is claimed is:

1. A control device for an acceleration sensor for controlling operation of an acceleration sensor attached to an occupant seat which is provided in a vehicle having a body so as to be movable in a longitudinal direction of the vehicle body, comprising:

an inertial moving system attached to an occupant seat for generating a mechanical output when the vehicle suddenly decelerates to thereby operate a seat belt pretensioner; and lock means for preventing the generation of said output of said inertial moving system when the occupant seat stops at a vehicle frontal side end, including a contact member operatively associated with movement of said vehicle seat for automatically actuating said lock means whenever said occupant seat stops at said frontal end position, whereby operation of the seat belt pretensioner is prevented even if the seat stops at the frontal end position and an acceleration acts upon said inertial moving system.

2. The device as claimed in claim 1, wherein said inertial moving system has an inertial body moved in response to acceleration, and a responsive moving member for generating a mechanical output according to movement of said inertial body, said lock means restraining movement of said responsive moving member.

3. The device as claimed in claim 1, wherein said contact member is provided with an elastic body for absorbing the movement of the occupant seat when the occupant seat is further moved toward the front of the vehicle after said contact member has been brought into contact with the inertial moving system.

4. The device as claimed in claim 1, wherein said contact member is mounted on said vehicle body and contacts a movable member that in turn contacts said inertial moving system when the seat moves.

5. The device as claimed in claim 4, wherein said contact member is brought into contact with said movable member and moved in and out within a locus of movement according to an acceleration response of said inertial moving system.

6. The device as claimed in claim 5, wherein said movable member is provided with a mechanism which stops at a position to deactivate the acceleration sensor, before said acceleration sensor is mounted on the vehicle body.

7. The device as claimed in claim 6, wherein said movable member is urged by a spring in a direction out of the locus of movement of said inertial moving system.

8. The device as claimed in claim 1, wherein said contact member is connected to a walk-in mechanism for moving a front seat to a frontal end position without stopping the seat in the course of its movement to allow an occupant to easily get in and out of the rear seat of the vehicle.

9. The device as claimed in claim 8, wherein said lock means deactivates said inertial moving system when an operation lever of the walk-in mechanism is operated.

10. The device as claimed in claim 8, wherein said lock means deactivates said inertial moving system when the walk-in mechanism is operated and a seatback of the front seat is tilted forward by a predetermined angle or more.

11. The device as claimed in claim 2, wherein said acceleration sensor is provided with a trigger lever for releasing an ignition pin from restraint by the movement of the inertial body and causing the ignition pin to collide with a detonator and said lock means restrains said trigger lever from moving.

12. The device as claimed in claim 11, wherein said trigger lever has one end which engages said inertial body and said ignition pin and the other end brought into engagement with said lock means.

13. A seat belt pretensioner mounted to a seat movable in the longitudinal direction of a vehicle, for applying a tensile force to a part of a seat belt, comprising:
- an acceleration sensor for detecting whether a vehicle acceleration is more than or equal to a predetermined value;
- a pretensioner body actuated by said acceleration sensor, for abruptly applying a tensile force to the seat belt; and
- lock means for deactivating said acceleration sensor and preventing said pretensioner body from operating when the seat is shifted a maximum amount toward the front of the vehicle and stops moving, including a contact member operatively associated with movement of said vehicle seat for automatically actuating said lock means whenever said seat is shifted said maximum amount.

14. The seat belt pretensioner as claimed in claim 13, wherein said contact member of said lock means is provided with an elastic body for absorbing the movement of the occupant seat when the occupant seat is further moved toward the front of the vehicle after said lock means has been brought into contact with the acceleration sensor.

15. The seat belt pretensioner as claimed in claim 13, wherein said acceleration sensor is provided with an inertial moving system that operates according to the movement of an inertial body and a movable member moved in and out within a locus of movement of said inertial moving system, said movable member retraining the movement of said inertial moving system by said lock means and being located to a position to enter said locus before said acceleration means is mounted to the vehicle.

16. The seat belt pretensioner as claimed in claim 15, wherein said acceleration sensor is provided with a trigger lever for enabling an ignition pin to move in response to the movement of the inertial body to thereby strike the ignition pin against a detonator, said ignition pin actuating a gas generator so a tensile force is applied to the seat belt, and said lock means restraining the movement of said trigger lever so as to prevent the ignition pin from moving when the seat suddenly decelerates.

17. A seat belt pretensioner mounted to a seat movable in the longitudinal direction of a vehicle, for applying a tensile force to a part of a seat belt, comprising:
- an acceleration sensor for detecting whether a vehicle acceleration is more than or equal to a predetermined value;
- a pretensioner body actuated by said acceleration sensor, for abruptly applying a tensile force to the seat belt; and
- lock means for transferring the operation of a walk-in mechanism for moving a front seat to a frontal end position without stopping the seat in the course of its movement by a special occupant operation to allow an occupant to easily get in and out of a rear seat of the vehicle, to said acceleration sensor and bringing said pretensioner body into a state of being incapable of being actuated even if the seat stops at the frontal end and an acceleration is developed due to the seat stoppage.

18. The seat belt pretensioner as claimed in claim 17, wherein said lock means inactivates an inertial moving system when an operation lever of said walk-in mechanism is actuated.

* * * * *